US005323601A

United States Patent [19]

Jarrell et al.

[11] Patent Number: 5,323,601

[45] Date of Patent: Jun. 28, 1994

[54] INDIVIDUALLY REMOVABLE COMBUSTOR LINER PANEL FOR A GAS TURBINE ENGINE

[75] Inventors: David W. Jarrell, West Palm Beach, Fla.; George F. Titterton, III, South Windsor; James D. Adams, Bolton, both of Conn.

[73] Assignee: United Technologies Corporation, Hartford, Conn.

[21] Appl. No.: 993,590

[22] Filed: Dec. 21, 1992

[51] Int. Cl.[5] .......... F02C 7/20; F02G 3/00

[52] U.S. Cl. .......... 60/39.31; 60/39.32; 60/752; 60/754

[58] Field of Search .......... 60/39.31, 39.32, 752, 60/754, 755, 757, 758, 760; 431/154

[56] References Cited

U.S. PATENT DOCUMENTS

Re. 30,160 11/1979 Emory, Jr. et al. .......... 60/752
3,706,203 12/1972 Goldberg et al. .......... 60/39.65
4,302,941 12/1981 DuBell .......... 60/757
4,512,159 4/1985 Memmen .......... 60/752
4,567,730 2/1986 Scott .......... 60/39.32
4,773,227 9/1988 Chabis .......... 60/757
4,901,522 2/1990 Commaret et al. .......... 60/39.32
5,055,032 10/1991 Altemark et al. .......... 431/154

*Primary Examiner*—Richard A. Bertsch
*Assistant Examiner*—Howard R. Richman

[57] ABSTRACT

This invention relates to a combustor liner for a gas turbine engine with means for loosely mounting one of the two spaced liner walls relative to the other to support it so that it "floats". The floating wall is made up of a plurality of segments to permit relatively minimal stress during thermal expansion, and the movement of each segment is restricted by at least one washer, and removal of the washer(s) permits the segment to be individually removed without removal of adjacent segments.

6 Claims, 3 Drawing Sheets

INDIVIDUALLY REMOVABLE COMBUSTOR LINER PANEL FOR A GAS TURBINE ENGINE

TECHNICAL FIELD

This invention relates to combustor liners for gas turbine engines and particularly to such liners that incorporate a counter-parallel cooling air flow construction that embodies a "floating" wall.

BACKGROUND ART

Certain state of the art gas turbine engines utilize finned materials for fabricating the thermal liner wall. Examples of such liner construction are disclosed in U.S. Pat. No. 3,706,203 granted to Goldberg et al on Dec. 19, 1972, and U.S. Pat. No. 4,302,941 granted to DuBell on Dec. 1, 1981. The '203 patent discloses a type of liner that comprises a pair of spaced walls formed in cylindrical bodies and attached end over end in louver fashion to form the combustion chamber. Parallel walls extending in a grate-like fashion from one wall interconnect the other wall and define therewith a plurality of open-ended longitudinal passageways. Because of the louver construction, the upstream end of each liner element accepts cooling air from the cooling air supply, and discharges it from the downstream end thereof into the combustion chamber. Succeeding louver sections pick up and discharge the cooling air in a like manner.

The '941 patent discloses a modified construction of the liner disclosed in the '203 patent, by providing inlet openings intermediate the upstream and downstream ends of each liner element and conducting the cooling air in both counter and parallel flow relation to the combustion products within the combustor. Additionally, in the liner disclosed in the '941 patent, the parallel walls extending from the hotter wall do not interconnect the other wall, thereby allowing the hotter wall to "float" with respect to the cooler wall. This serves to reduce heat transfer to the cooler wall, thereby extending the life thereof. Further cooling is obtained by extending the downstream end of the floating wall to define a lip and thereby reestablish a film of cooling air for improved film cooling of the transition area between axially adjacent elements of the floating wall. Thus the lip at the downstream end of each floating wall element overlaps the upstream end of the floating wall element immediately downstream thereof.

One of the shortcomings of the floating wall liner disclosed in the '941 patent is that in order to remove a particular element of the floating wall, each of the elements upstream of that particular element must be removed first due to the overlapping lip of the upstream element. Therefore, if one element of the floating wall is damaged, a large number of elements may have to be removed in order to remove and replace the damaged element. Having to remove so many elements merely to replace a single element of the floating wall adds to the cost of maintaining the combustor and adds to the overall cost of operating the gas turbine engine that incorporates such liners.

What is needed is a liner for the combustor of a gas turbine engine in which a particular element of the floating wall can be replaced without necessitating removal of the elements immediately upstream thereof.

SUMMARY OF THE INVENTION

An object of the present invention is to provide for a gas turbine engine a liner for the combustor thereof which liner can be maintained by removing individual liner elements.

Another object of the present invention is to provide a combustor liner having an inner wall that is supported in spaced relation to an outer wall, wherein the inner wall comprises a plurality of liner elements, each of which is individually removable without first removing adjacent elements.

Accordingly, the liner of the present invention includes an outer liner wall generally configured in a cylindrical shape having a longitudinally extending axis defined therethrough, and a plurality of segmented ring elements disposed within the outer liner wall, defining an inner wall relative to the outer liner wall. Each of the ring elements has a first edge upstream from a second edge, and the second edge of a particular ring element overlaps the first edge of the ring element immediately adjacent downstream of the particular ring element. Each segment of each element is attached to outer liner wall by a stud and fastener, and the stud extends through an opening in the outer liner wall that is large enough to permit sufficient movement of the stud along the longitudinal axis to permit the first edge of the segment to clear the overlapping second edge of the adjacent segment. A washer is secured to the stud of each segment by the fastener thereon, and part of the washer extends into the opening to restrict axial movement of the stud while the washer is secured thereto.

Other features and advantages will be apparent from the specification and claims and from the accompanying drawings which illustrate an embodiment of this invention.

BEST MODE FOR CARRYING OUT THE INVENTION

It is contemplated within the scope of this invention and which will appear obvious to one ordinarily skilled in the art that the liner envisioned in this invention can be utilized in a can, annular or combination thereof combustor.

Figure 1:
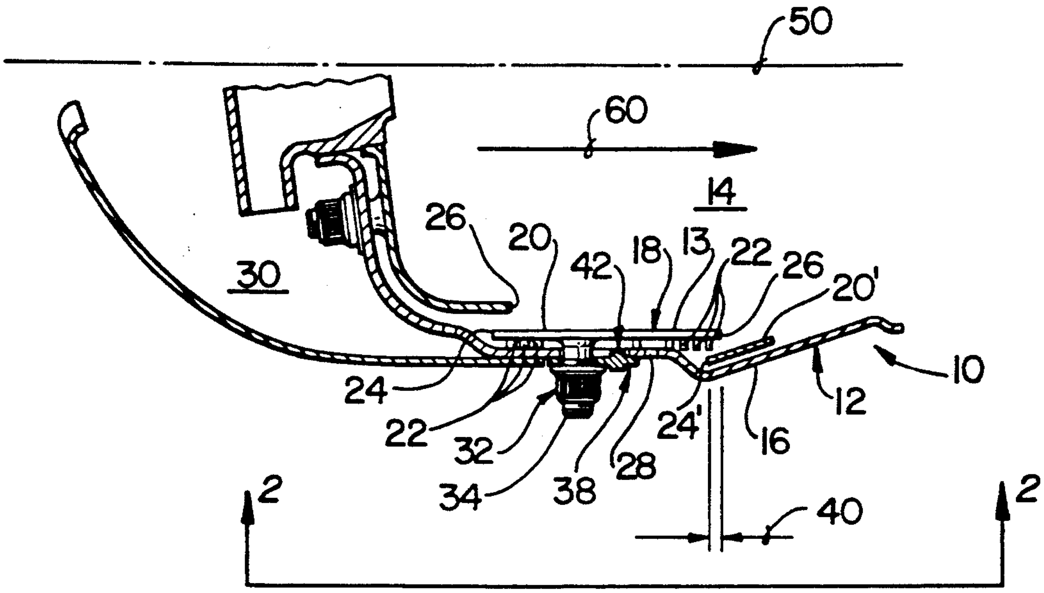
FIG. 1 is a partial view of a combustor liner in section illustrating the details of this invention.

As noted in FIG. 1 the liner 10 comprises an outer annular wall 12 having a longitudinal axis 50 defined therethrough, the outer wall 12 defining a combustion chamber 14 wherein combustion occurs. The hot combustion gases flow in the direction indicated by the arrow 60 as shown. The generally cylindrical outer wall 12 is stepped into conical shaped sections 16 to define a louver configuration.

Figure 2:
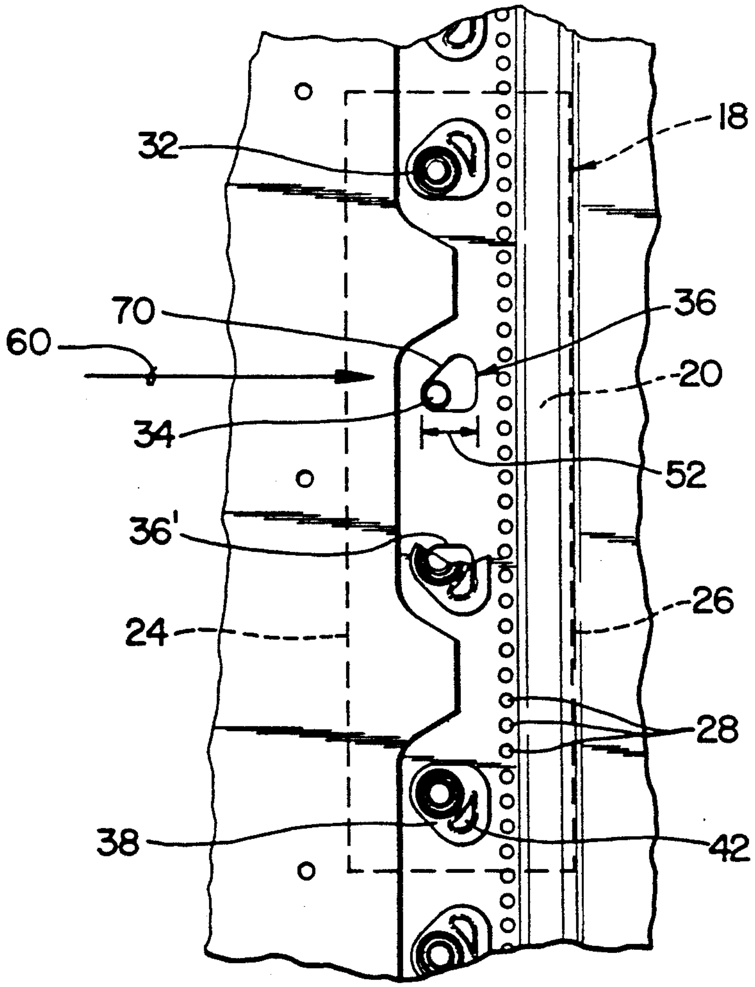
FIG. 2 is a partial view taken along line 2—2 of FIG. 1 and showing one of the openings, and the segment in phantom.

As shown in FIGS. 1 and 2, the inner wall 13 is made up of a plurality of segmented ring elements 18 disposed along the axis 50, and each ring element 18 is made up of a plurality of annular, radially spaced wall segments 20. Each of the segments 20 is loosely attached to the outer wall 12 and each of these segments 20 carries a plurality of pins 22 extending radially toward the outer wall 12 thereof. The spaces between the pins 22 define flowpaths that extend in the direction 60 of the flow of hot gases in the combustor along the longitudinal axis 50. Each segment includes a first edge 24 which, relative to the flow 60 of the combustion gases, is upstream from the second edge 26.

As will be appreciated from the foregoing, cooling air discharging from the compressor of the gas turbine engine (not shown) is admitted into a plurality of inlets 28 which are located between the upstream edge 24 and the downstream edge 26 of each segment 20 relative to the flow of the combustion gases. The inlets 28 serve to manifold the cooling air so that a portion thereof flows counter to the flow of combustion gases and a portion flows parallel thereto. The cooling air flowing in these passages effectively picks up heat by convection from the pins 22 and the inner wall 20, and the cooling air is then discharged at the upstream and downstream edges 24, 26 to effectuate film cooling of the liner 10. To enhance film cooling, the downstream edge 26 of each segment 20 extends beyond, and overlaps, the upstream edge 24' of the adjacent segment 20' by a predetermined distance 40, as shown in FIG. 1. The discharging flow forms a film that provides effective film cooling of the transition zone between adjacent segments 20.

To assure that the segments 20 and the pins 22 extending therefrom do not bear against the outer wall 12 despite thermal expansion and deformation, it is preferred that the inner wall 13 of the liner 10 is segmented in the circumferential direction. Thus, the inner liner wall segments 20 are spaced circumferentially within the outer liner wall 12, encircling the combustion gases with a convective heat exchange of parallel and counter flow cooling air. Each of the segments 20 is loosely retained by a suitable number of fasteners of the type known in the art. As shown, each segment 20 is secured in place by several nuts 32. Each nut 32 is attached to a stud 34 that is fixedly secured to the segment 20 by a manner known in the art, such as brazing, welding, diffusion bonding, integrally cast, etc. Each stud 34 extends through an opening 36 in the outer liner wall 12 as shown in FIG. 2. Note that, as shown in FIG. 2, the stud 34 is always located in one of the corners of the opening 36 adjacent the hypotenuse 70 of the curvatriangular opening 36. Likewise, the hole 48 of each washer 38 is located in a corner adjacent the hypotenuse thereof. As shown in FIG. 2, the openings 36, 36' are mirror images of one another. The nut 32 may be tack welded to the end of stud 34, or a lock-nut may be used to secure each segment 20.

The dimension of each opening parallel to the axis 50 is at least as great as the sum of the predetermined distance 40 and the diameter of the stud 34, for the reasons discussed below. Additionally, the narrowest dimension of each opening 36 is wider than the diameter of the stud 34 to allow for circumferential thermal growth of the segment 20.

Figure 3:
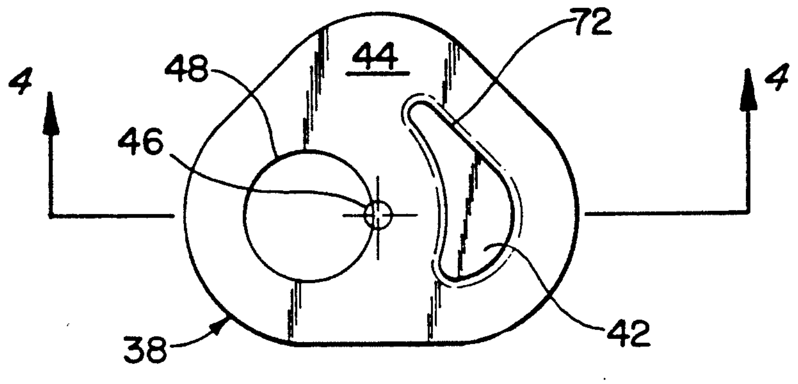
FIG. 3 is a plan showing the washer of the present invention.
Figure 4:
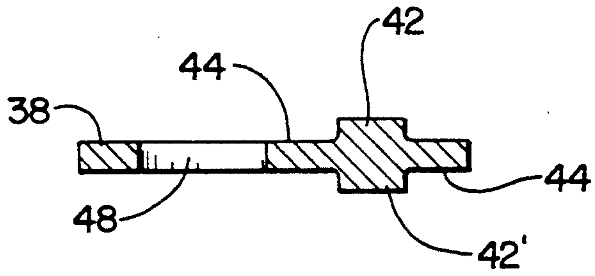
FIG. 4 is a cross-sectional view of the washer taken along line 4—4 of FIG. 3.

A washer 38 is removably secured to each stud 20 by the fastener thereon, and includes a post 42 extending from at least one surface 44 thereof as shown in FIGS. 3 and 4. Preferably, the washer 38 includes a second post 42' extending from the opposite surface 44' so that the second surface 44' is the mirror image of the first surface 44 for the reason set forth below. The post 42 extends into the opening 36 to restrict movement of the stud parallel to the axis 60 to less than the predetermined distance 40. The washer 38 thus prevents the segment 20 from sliding in the downstream direction enough to clear the second edge 26 of the adjacent segment 20 so long as the washer 38 is in place on the stud 34.

Preferably, each of the openings 36 and washers 38 is curvatriangular in shape, to ease assembly of the segments 20 to the outer liner wall 12. As used herein, the term "curvatriangular" means a generally right triangular shape wherein each of the adjoining sides of a the "triangle" are connected by a curved line having a radius of curvature at least as great as the diameter of the stud 34. As those skilled in the art will readily appreciate, since each of the segments 20 is curved, and the studs 34 extend radially outward of each segment 20, the curvatriangular openings permit all of the studs to be simultaneously inserted through the openings 36 in the outer wall without bending any of the studs 34 or damaging the outer liner wall 12.

As those skilled in the art will readily appreciate, since the surfaces 44, 44' are mirror images of each other, and since the openings 36, 36' are mirror images of each other, the same washer 38 can be used to seal either opening 36, 36' by merely flipping the washer 38 with the appropriate surface 44, 44' facing the outer annular wall 12. To prevent incorrect installation of the washer 38, each of the posts 42, 42' is asymmetric in shape, as shown in FIG. 3, so that the tip 72 of the post 42, 42' will hang up on the outer wall 12 if improperly installed, preventing the washer 38 from resting flush against the outer wall 12. This is intended as a visual and physical indicator that the washer 38 is improperly installed, indicating that the washer 38 should be flipped over and re-installed so that it does lie flush against the outer wall 12.

Each opening 36 is slightly smaller dimensioned than the washer 38 thereon to prevent the washer 38 from passing therethrough, and each washer 38 has a geometric center 46 and a hole 48 to receive one of the studs 34. The hole 48 is off-centered relative to the center 46 of the washer 38 to properly position the stud 34 within the opening 36.

Figure 5:
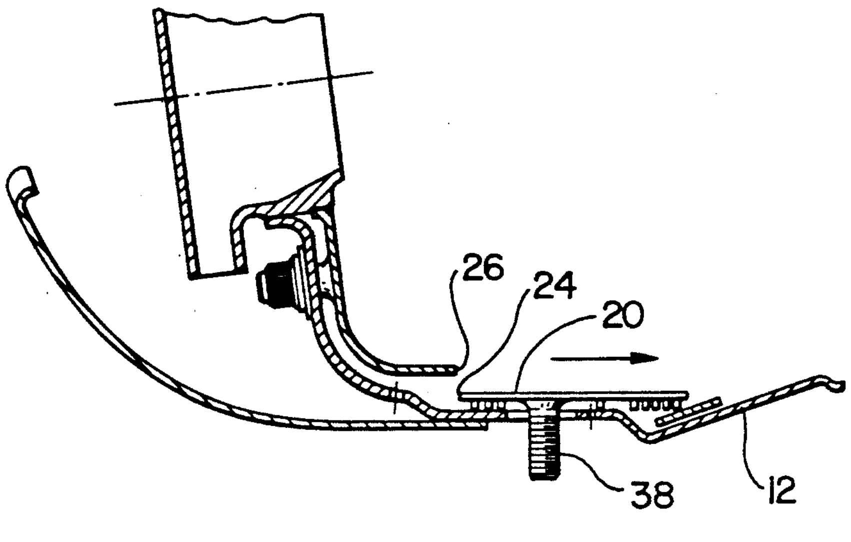
FIGS. 5 and 6 show the view of FIG. 1 for the purpose of disclosing the method of individually removing one of the segments of the present invention.
Figure 6:
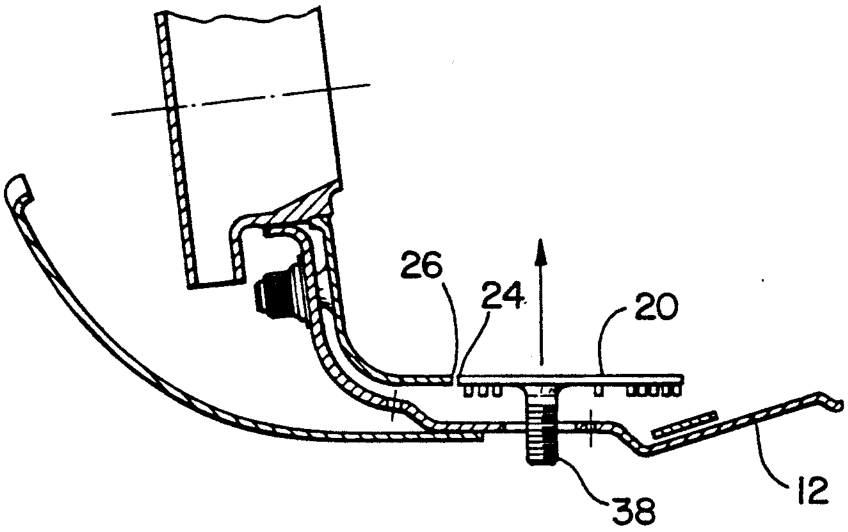

FIGS. 5 and 6 show the method of individually removing one of the segments 20. After the nuts 32 and washers 38 have been removed from the studs 34, the segment 20 is slid in a downstream direction parallel to the axis 60 a distance at least as great as the predetermined distance 40 so that the upstream edge 24 of the segment 20 clears the overlapping downstream edge 26 of the inner wall 13 immediately upstream of the segment 20, as shown in FIG. 5. Then the segment 20 is slid radially toward the axis 60, and removed from the liner 10, as shown in FIG. 6. By providing for the individual removal of the segments as described above, the cost of maintaining the combustor and the overall cost of operating gas turbine engines that incorporate the liner disclosed herein can be reduced.

It should be understood that the invention is not limited to the particular embodiments shown and described herein, but that various changes and modifications may be made without departing from the spirit and scope of this novel design as defined by the claims below.

I claim:

1. A combustor liner for protecting the combustor of a gas turbine engine from combustion products flowing therethrough by cooling the liner with air from a compressor of the gas turbine engine, said liner comprising:

an outer liner wall generally configured in a cylindrical shape and having a longitudinally extending axis defined therethrough, said combustion products flowing substantially parallel to said axis;

a plurality of segmented ring elements disposed along said axis, each of said ring elements comprising a plurality of segments located radially inward from said outer liner wall, relative to said axis, thereby defining an inner wall relative to the outer liner wall, each of said segments in spaced relation to said outer liner wall defining a substantially annular passage between the inner wall and the outer liner wall, each of said segments concentric with said axis and including a first edge and a second edge, said first edge upstream from said second edge relative to the flow of the combustion products, the second edge of each segment overlapping the first edge of adjacent segments by a predetermined distance; and, each of said segments including securing means for movably securing the inner wall to said outer liner wall to minimize thermal stresses occasioned during the firing of the combustor, each securing means including a stud having a known diameter and fixedly secured to one of the segments, said stud extending through an opening in said outer liner wall, said opening having a first dimension of each opening that is at least as large as the sum of the predetermined distance and the diameter of the stud, a fastener attached to an end of said stud radially outward of said outer liner wall relative to said axis, and means for controlling axial movement of each segment, said means comprising a washer removably secured to said stud by said fastener, at least part of the washer extending into said opening and restricting axial movement of the segment to less than the predetermined distance while the washer is secured to the stud.

2. A combustor liner as claimed in claim 1 wherein said washer includes a post extending from a first surface thereof, said post extending into said opening to restrict axial movement of the segment to less than the predetermined distance while the washer is secured to the stud.

3. A combustor liner as claimed in claim 2 wherein said washer includes a second post extending from a second surface opposite said first surface, said second surface the mirror image of said first surface and each of said posts is asymmetric in shape.

4. A combustor liner as claimed in claim 3 wherein each washer includes a center, each washer is curvatriangular in shape, each opening is curvatriangular in shape and slightly smaller dimensioned than the washer extending therein, and each washer includes a hole that is off-centered relative to the center thereof, said hole for receiving a stud therein.

5. A combustor liner as claimed in claim 4 wherein each of the segments must be moved axially said predetermined distance prior to being removed from within the outer liner wall.

6. A combustor liner as claimed in claim 5 wherein each of the segments includes a plurality of pins projecting into said annular passage toward said outer liner wall.

* * * * *

UNITED STATES PATENT AND TRADEMARK OFFICE

CERTIFICATE OF CORRECTION

PATENT NO. : 5,323,601

DATED : June 28, 1994

INVENTOR(S) : David W. Jarrell et al

It is certified that error appears in the above-indentified patent and that said Letters Patent is hereby corrected as shown below:

column 3 at line 68, change "axis 60" to --axis 50--.
column 4 at line 48, change "axis 60" to --axis 50--.
column 4 at line 53, change "axis 60" to --axis 50--.

Signed and Sealed this

Twenty-seventh Day of September, 1994

Attest:

BRUCE LEHMAN

Attesting Officer

*Commissioner of Patents and Trademarks*